(12) United States Patent
Leavitt

(10) Patent No.: US 9,233,506 B2
(45) Date of Patent: Jan. 12, 2016

(54) LIQUEFIER ASSEMBLY FOR USE IN ADDITIVE MANUFACTURING SYSTEM

(71) Applicant: Stratasys, Inc., Eden Prairie, MN (US)

(72) Inventor: Paul J. Leavitt, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 477 days.

(21) Appl. No.: 13/708,037

(22) Filed: Dec. 7, 2012

(65) Prior Publication Data

US 2014/0159284 A1 Jun. 12, 2014

(51) Int. Cl.
| | |
|---|---|
| B29B 13/02 | (2006.01) |
| B29C 47/78 | (2006.01) |
| B67D 7/82 | (2010.01) |
| H05B 3/02 | (2006.01) |
| B29C 67/00 | (2006.01) |
| F16L 53/00 | (2006.01) |
| H05B 3/42 | (2006.01) |

(52) U.S. Cl.
CPC .......... B29C 67/0085 (2013.01); B29B 13/022 (2013.01); B29C 67/0055 (2013.01); F16L 53/001 (2013.01); H05B 3/42 (2013.01); H05B 2203/021 (2013.01)

(58) Field of Classification Search
CPC ...... B29B 13/02; B29B 13/022; B29C 47/78; B67D 7/82; H05B 3/02; H05B 3/40; H05B 6/10; H05B 6/80; H05B 2203/021; F16L 53/00; F16L 53/001; F16L 53/002; F16L 53/004; F16L 53/005; F16L 53/007; F16L 53/008
USPC ........ 264/308; 425/375, 378.1, 461; 137/334, 137/341; 219/628, 687; 222/146.2, 146.4, 222/146.5; 392/480
See application file for complete search history.

(56) References Cited

U.S. PATENT DOCUMENTS

| | | | |
|---|---|---|---|
| 4,479,347 A | 10/1984 | Larsen et al. | 56/344 |
| 4,797,313 A | 1/1989 | Stolk et al. | 428/156 |
| 5,121,329 A | 6/1992 | Crump | 364/468 |
| 5,169,081 A | 12/1992 | Goedderz | 242/54 |
| 5,303,141 A | 4/1994 | Batchelder et al. | 364/149 |
| 5,312,224 A | 5/1994 | Batchelder et al. | 415/73 |
| 5,340,433 A | 8/1994 | Crump | 156/578 |
| 5,342,687 A | 8/1994 | Iwai et al. | 428/402 |
| 5,503,785 A | 4/1996 | Crump et al. | 264/40.7 |
| 5,738,817 A | 4/1998 | Danforth et al. | 264/603 |
| 5,764,521 A | 6/1998 | Batchelder et al. | 364/475.01 |
| 5,866,058 A | 2/1999 | Batchelder et al. | 264/237 |
| 5,900,207 A | 5/1999 | Danforth et al. | 264/603 |
| 5,939,008 A | 8/1999 | Comb et al. | 264/308 |
| 5,968,561 A | 10/1999 | Batchelder et al. | 425/375 |

(Continued)

OTHER PUBLICATIONS

"BFB 3000 Operations manual", Bits From Bytes, bitsfrombytes. com, 2010, pp. 1-60 (see e.g. pp. 16 and 36).

(Continued)

Primary Examiner — Leo B Tentoni
(74) Attorney, Agent, or Firm — Westman, Champlin & Koehler, P.A.

(57) ABSTRACT

A liquefier assembly for use in an additive manufacturing system, where the liquefier assembly includes a liquefier tube, a nozzle secured to an outlet end of the liquefier tube, a heating element extending at least partially around the liquefier tube to generate a hot zone in the liquefier tube, a hollow spacer disposed in the channel; and a hollow liner disposed in the channel abutting against an upstream shoulder of the hollow spacer.

14 Claims, 8 Drawing Sheets

(56) References Cited

U.S. PATENT DOCUMENTS

| | | | |
|---|---|---|---|
| 6,004,124 A | 12/1999 | Swanson et al. | 425/375 |
| 6,022,207 A | 2/2000 | Dahlin et al. | 425/145 |
| 6,054,077 A | 4/2000 | Comb et al. | 264/40.7 |
| 6,067,480 A | 5/2000 | Stuffle et al. | 700/109 |
| 6,070,107 A | 5/2000 | Lombardi et al. | 700/119 |
| 6,085,957 A | 7/2000 | Zinniel et al. | 226/8 |
| 6,129,872 A | 10/2000 | Jang | 264/75 |
| 6,228,923 B1 | 5/2001 | Lombardi et al. | 524/425 |
| 6,257,517 B1 | 7/2001 | Babish et al. | 242/365.6 |
| 6,547,995 B1 | 4/2003 | Comb | 264/40.1 |
| 6,645,412 B2 | 11/2003 | Priedeman, Jr. | 264/219 |
| 6,685,866 B2 | 2/2004 | Swanson et al. | 264/308 |
| 6,722,872 B1 | 4/2004 | Swanson et al. | 425/225 |
| 6,730,252 B1 | 5/2004 | Teoh et al. | 264/178 |
| 6,749,414 B1 | 6/2004 | Hanson et al. | 425/130 |
| 6,790,403 B1 | 9/2004 | Priedeman, Jr. et al. | 264/442 |
| 6,814,907 B1 | 11/2004 | Comb | 264/40.07 |
| 6,869,559 B2 | 3/2005 | Hopkins | 264/489 |
| 6,923,634 B2 | 8/2005 | Swanson et al. | 425/169 |
| 6,998,087 B1 | 2/2006 | Hanson et al. | 264/308 |
| 7,122,246 B2 | 10/2006 | Comb et al. | 428/364 |
| 7,172,715 B2 | 2/2007 | Swanson et al. | 264/39 |
| 7,363,686 B2 | 4/2008 | Fukuyasu et al. | 24/30.5 |
| 7,384,255 B2 | 6/2008 | LaBossiere et al. | 425/190 |
| 7,604,470 B2 | 10/2009 | LaBossiere et al. | 425/131.1 |
| 7,625,200 B2 | 12/2009 | Leavitt | 425/375 |
| 7,896,209 B2 | 3/2011 | Batchelder et al. | |
| 8,153,182 B2 | 4/2012 | Comb et al. | |
| 8,221,669 B2 | 7/2012 | Batchelder et al. | 264/308 |
| 8,236,227 B2 | 8/2012 | Batchelder et al. | |
| 2005/0129941 A1 | 6/2005 | Comb et al. | 428/364 |
| 2007/0003656 A1 | 1/2007 | LaBossiere et al. | 425/375 |
| 2007/0228590 A1 | 10/2007 | LaBossiere et al. | 264/40.1 |
| 2009/0035405 A1 | 2/2009 | Leavitt | 425/97 |
| 2009/0263582 A1 | 10/2009 | Batchelder | 427/256 |
| 2009/0273122 A1 | 11/2009 | Batchelder et al. | 264/401 |
| 2009/0274540 A1 | 11/2009 | Batchelder et al. | 414/431 |
| 2010/0018924 A1 | 1/2010 | Fendya et al. | 210/648 |
| 2010/0096072 A1 | 4/2010 | Hopkins et al. | 156/155 |
| 2010/0096485 A1 | 4/2010 | Taatjes et al. | 242/171 |
| 2010/0096489 A1 | 4/2010 | Taatjes et al. | 242/520 |
| 2010/0100224 A1 | 4/2010 | Comb et al. | 700/118 |
| 2010/0283172 A1 | 11/2010 | Swanson | |
| 2010/0327479 A1 | 12/2010 | Zinniel et al. | 264/172.14 |
| 2011/0074065 A1 | 3/2011 | Batchelder et al. | 264/308 |
| 2011/0076495 A1 | 3/2011 | Batchelder et al. | 428/369 |
| 2011/0076496 A1 | 3/2011 | Batchelder et al. | 428/373 |
| 2011/0117268 A1 | 5/2011 | Batchelder et al. | 427/8 |
| 2011/0121476 A1 | 5/2011 | Batchelder et al. | 264/40.1 |
| 2011/0233804 A1 | 9/2011 | Batchelder et al. | 264/40.4 |
| 2012/0018924 A1 | 1/2012 | Swanson et al. | |
| 2012/0068378 A1 | 3/2012 | Swanson et al. | 264/308 |
| 2012/0070523 A1 | 3/2012 | Swanson et al. | 425/96 |
| 2012/0164256 A1 | 6/2012 | Swanson et al. | |
| 2013/0078073 A1 | 3/2013 | Comb et al. | |

OTHER PUBLICATIONS

"Plastruder MK5 Assembly", MakerBot Industries, http://wiki.makerbot.com/plastruder-mk5-assembly, last updated on Dec. 8, 2010, pp. 1-52.

LIQUEFIER ASSEMBLY FOR USE IN ADDITIVE MANUFACTURING SYSTEM

BACKGROUND

The present disclosure relates to additive manufacturing systems for printing or otherwise building three-dimensional (3D) parts with layer-based, additive manufacturing techniques. In particular, the present disclosure relates to liquefier assemblies for use in extrusion-based additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a liquefier assembly for use in an additive manufacturing system. The liquefier assembly includes a liquefier tube compositionally comprising a first thermally conductive material, and having an inlet end and outlet end offset along a longitudinal axis, and a channel extending between the inlet end and the outlet end. The liquefier assembly includes a nozzle secured to the outlet end of the liquefier tube, and a heating element in thermal contact with the liquefier tube, where the heating element is configured to generate a heating zone in the liquefier tube. The liquefier assembly further includes a hollow spacer compositionally comprising a second thermally conductive material, and a hollow liner compositionally comprising a low-surface energy material. The hollow spacer is disposed in the channel and having a first end adjacent to the nozzle and a second end that defines a shoulder that is upstream along the longitudinal axis from the heating zone when generated by the heating element. The hollow liner is also disposed in the channel, and has a first end abutting against the shoulder of the hollow spacer.

Another aspect of the present disclosure is directed to a liquefier assembly for use in an additive manufacturing system, where the liquefier assembly includes a liquefier tube having an inlet end, an outlet end, and a channel extending therebetweeen, a nozzle secured to the outlet end of the liquefier tube, and a heating element in thermal contact with the liquefier tube, where the heating element is configured to generate a heating zone in the liquefier tube. The liquefier assembly also includes a hollow spacer disposed in the channel, where the hollow spacer has a downstream end adjacent to the nozzle, an upstream end defining a shoulder, and a heat conductive interior surface. The liquefier assembly further includes a hollow liner disposed in the channel having a low surface-energy interior surface and having a downstream end abutting against the shoulder of the hollow spacer, where the shoulder of the hollow spacer is positioned along the channel such that the downstream end of the hollow liner remains at least about 35° C. below a temperature of an upstream edge of the heating zone when generated by the thermal element.

Another aspect of the present disclosure is directed to a method for printing a three-dimensional part with an additive manufacturing system. The method includes providing a print head having a liquefier assembly that comprises a liquefier tube, a nozzle, a hollow spacer compositionally comprising a metallic material, and a hollow liner compositionally comprising a fluoropolymer, where the hollow spacer is disposed in the liquefier tube between the nozzle and the hollow liner. The method also includes generating a heating zone in the liquefier tube, and maintaining a downstream end of the hollow liner at a temperature that is at least about 35° C. below a temperature of an upstream edge of the generated heating zone. The method further includes feeding a filament of a material through the hollow liner and into the hollow spacer, melting the material of the fed filament in the hollow spacer with the generated heating zone, and extruding the molten material from the nozzle to print the three-dimensional part in a layer-by-layer manner.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

The present disclosure is directed to a liquefier assembly for use in an additive manufacturing system to melt and extrude consumable filaments, such as part and support material filaments. The liquefier assembly is preferably a subcomponent of a print head, where the print head is retainable by an additive manufacturing system for printing 3D parts and/or support structures in a layer-by-layer manner. The liquefier assembly includes a liquefier tube with an upstream, low-surface energy, hollow liner and a downstream, thermally-stable, heat conductive hollow spacer, where the upstream liner and downstream spacer are each preferably insertable into the liquefier tube.

As discussed below, the liner reduces drive pressures required to feed filaments into the liquefier tube at an upstream location along the liquefier tube where the filaments are solid or mostly solid. In situations where the filaments compositionally include soluble support materials, the liner also reduces the adhesion of these materials to the liquefier tube inlet, reducing the risk of liquefier plugging. The low-surface-energy liner stops short of the downstream hot zone, where different material properties are preferred.

The spacer, on the other hand, reduces the cross-sectional gap between the inner wall of the liquefier tube and the filaments at a downstream location along the liquefier tube where the filament melts (i.e., in a hot zone), while optimizing material properties for the hot zone. The reduced cross-sectional gap lessens back flows of the molten filament materials during seam starts, reducing seam variations during printing operations.

This combination of the upstream liner and the downstream spacer, where the liner is offset from the hot zone of the liquefier tube, preserves the integrity of the liner, thereby increasing the life span of the liquefier assembly. Furthermore, the insertable nature of the upstream liner and the downstream spacer allow the thermal and frictional profile of the liquefier assembly to be customized in a low-cost manner to accommodate a variety of different filament materials and flow profiles.

Figure 1:
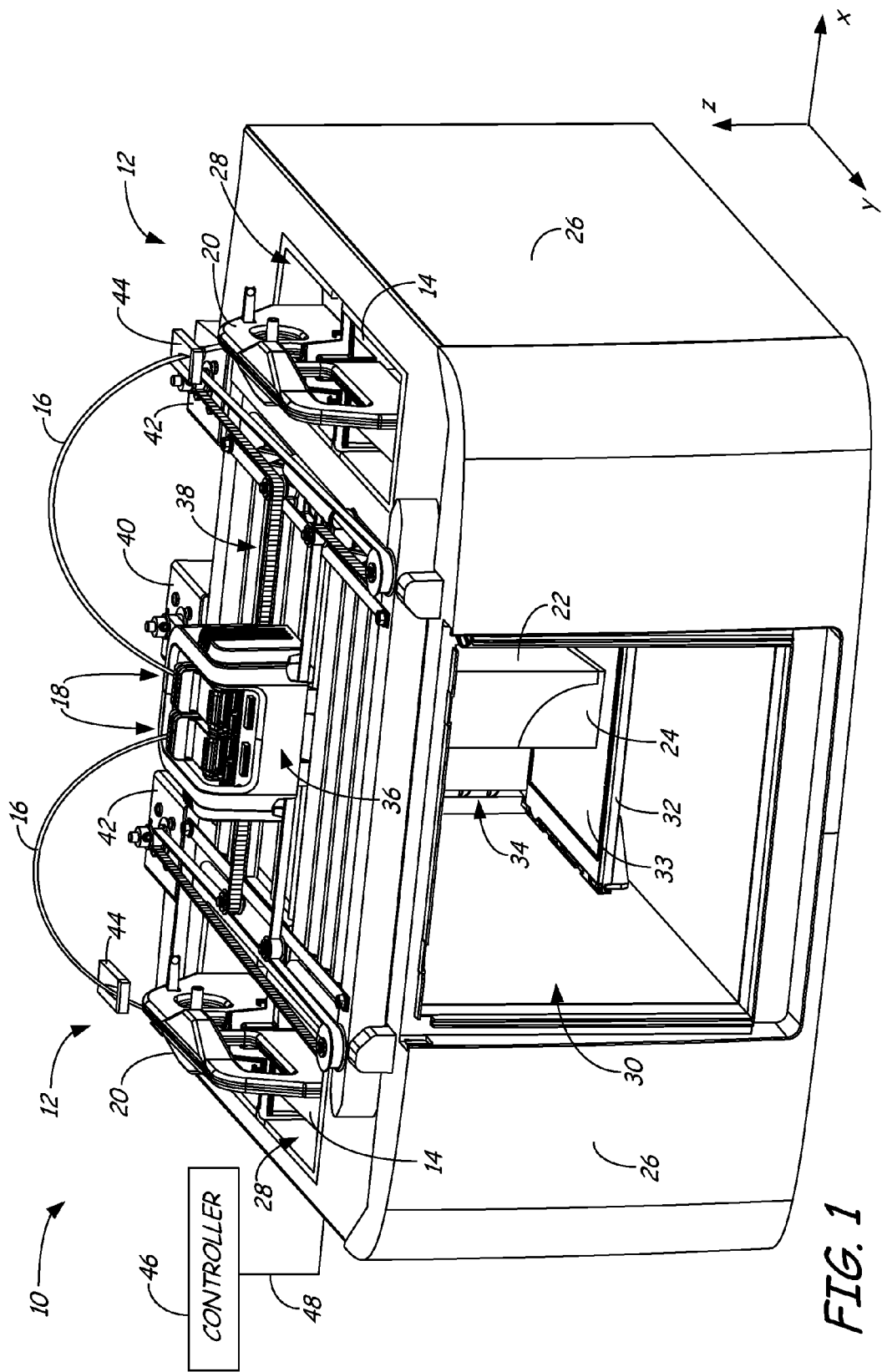
FIG. 1 is a top, front perspective view of an additive manufacturing system in use with consumable assemblies, which includes a liquefier assembly of the present disclosure.

FIG. 1 shows system 10 in use with two consumable assemblies 12, where each consumable assembly 12 is an easily loadable, removable, and replaceable container device that retains a supply of a consumable filament for printing with system 10. Typically, one of the consumable assemblies 12 contains a part material filament ("part material consumable assembly"), and the other consumable assembly 12 contains a support material filament ("support material consumable assembly"). However, both consumable assemblies 12 may be identical in structure.

In the shown embodiment, each consumable assembly 12 includes container portion 14, guide tube 16, print head 18, and handle 20, where each print head 18 preferably includes a liquefier assembly of the present disclosure. Container portion 14 may retain a spool or coil of a consumable filament, such as discussed in Mannella et al., U.S. patent application Ser. Nos. 13/334,910 and 13/334,921. Guide tube 16 interconnects container portion 14 and print head 18, where the drive mechanism of print head 18 draws successive segments of the consumable filament from container portion 14 and through guide tube 16.

In this embodiment, guide tube 16 and print head 18 are subcomponents of consumable assembly 12, and may be interchanged to and from system 10 with each consumable assembly 12. In alternative embodiments, guide tube 16 and/or print head 18 may be components of system 10, rather than subcomponents of consumable assemblies 12.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING". As shown, system 10 includes system casing 26, two bays 28, chamber 30, platen 32, platen gantry 34, head carriage 36, head gantry 38, z-axis motor 40, and a pair of x-y motors 42.

System casing 26 is a structural component of system 10 and may include multiple structural sub-components such as support frames, housing walls, and the like. In the shown embodiment, system casing 26 defines the dimensions of bays 28, and of chamber 30. Bays 28 are container bays configured to respectively receive container portions 14 of consumable assemblies 12. Typically, each of bays 28 may be intended to receive either a part material consumable assembly 12 or a support material consumable assembly 12.

In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading consumable assemblies 12.

Chamber 30 is an enclosed environment that contains platen 32 for printing 3D part 22 and support structure 24. Chamber 30 may be heated (e.g., with circulating heated air) to reduce the rate at which the part and support materials solidify after being extruded and deposited (e.g., to reduce distortions and curling). In alternative embodiments, chamber 30 may be omitted and/or replaced with different types of build environments. For example, 3D part 22 and support structure 24 may be built in a build environment that is open to ambient conditions or may be enclosed with alternative structures (e.g., flexible curtains).

Platen 32 is a platform on which 3D part 22 and support structure 24 are printed in a layer-by-layer manner, and is supported by platen gantry 34. In some embodiments, platen 32 may engage and support a build substrate 33, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 32 or onto the build substrate 33. Platen gantry 34 is a gantry assembly configured to move platen 32 along (or substantially along) the vertical z-axis and is powered by z-axis motor 40.

Head carriage 36 is a unit configured to receive one or more removable print heads, such as print heads 18, and is supported by head gantry 38. Examples of suitable devices for head carriage 36, and techniques for retaining print heads 18 in head carriage 36, include those disclosed in Swanson et al., U.S. Publication Nos. 2010/0283172 and 2012/0164256.

As mentioned above, in some embodiments, guide tube 16 and/or print head 18 may be components of system 10, rather than subcomponents of consumable assemblies 12. In these embodiments, additional examples of suitable devices for print heads 18, and the connections between print heads 18 and head gantry 38 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182.

In the shown embodiment, head gantry 38 is a belt-driven gantry assembly configured to move head carriage 36 (and the retained print heads 18) in (or substantially in) a horizontal x-y plane above chamber 30, and is powered by x-y motors 42. Examples of suitable gantry assemblies for head gantry 38 include those disclosed in Comb et al., U.S. patent Ser. No. 13/242,561.

In an alternative embodiment, platen 32 may be configured to move in the horizontal x-y plane within chamber 30, and head carriage 36 (and print heads 18) may be configured to move along the z-axis. Other similar arrangements may also be used such that one or both of platen 32 and print heads 18 are moveable relative to each other. Platen 32 and head carriage 36 (and print heads 18) may also be oriented along different axes. For example, platen 32 may be oriented vertically and print heads 18 may print 3D part 22 and support structure 24 along the x-axis or the y-axis.

As further shown in FIG. 1, system 10 may also include a pair of sensor assemblies 44, which, in the shown embodiment, are located adjacent to bays 28. Sensor assemblies 44 are configured to receive and retain guide tubes 16, while also providing sufficient ranges of movement for guide tubes 16 and print heads 18. Sensor assemblies 44 are also configured to read encoded markings from successive segments of the consumable filaments moving through guide tubes 16. Examples of suitable devices for sensor assemblies 44 include those disclosed in Batchelder et al., U.S. Patent Application Publication Nos. 2011/0117268, 2011/0121476, and 2011/0233804.

System 10 also includes controller 46, which is one or more control circuits configured to monitor and operate the components of system 10. For example, one or more of the control functions performed by controller 46 can be implemented in hardware, software, firmware, and the like, or a combination thereof. Controller 46 may communicate over communication line 48 with print heads 18, chamber 30 (e.g., with a heating unit for chamber 30), head carriage 36, motors 40 and 42, sensor assemblies 44, and various sensors, calibration devices, display devices, and/or user input devices. In some embodiments, controller 46 may also communicate with one or more of bays 28, platen 32, platen gantry 34, head gantry 38, and any other suitable component of system 10.

While illustrated as a single signal line, communication line 48 may include one or more electrical, optical, and/or wireless signal lines, allowing controller 46 to communicate with various components of system 10. Furthermore, while illustrated outside of system 10, controller 46 and communication line 48 may be internal components to system 10. System 10 and/or controller 46 may also communicate with one or more computer-based systems (not shown), which may include computer-based hardware, such as data storage devices, processors, memory modules and the like for generating, storing, and transmitting tool path and related printing instructions to system 10.

During operation, controller 46 may direct z-axis motor 40 and platen gantry 34 to move platen 32 to a predetermined height within chamber 30. Controller 46 may then direct motors 42 and head gantry 38 to move head carriage 36 (and the retained print heads 18) around in the horizontal x-y plane above chamber 30. Controller 46 may also direct print heads 18 to selectively draw successive segments of the consumable filaments from container portions 14 and through guide tubes 16, respectively.

Each print head 18 preferably includes a liquefier assembly of the present disclosure, which thermally melts the successive segments of the received consumable filament such that the filament becomes a molten material. The molten material is then extruded and deposited onto platen 32 for printing 3D part 22 and support structure 24 in a layer-by-layer manner. After the print operation is complete, the resulting 3D part 32 and support structure 24 may be removed from chamber 30, and support structure 24 may be removed from 3D part 22. 3D part 22 may then undergo one or more additional post-processing steps.

Figure 2A:
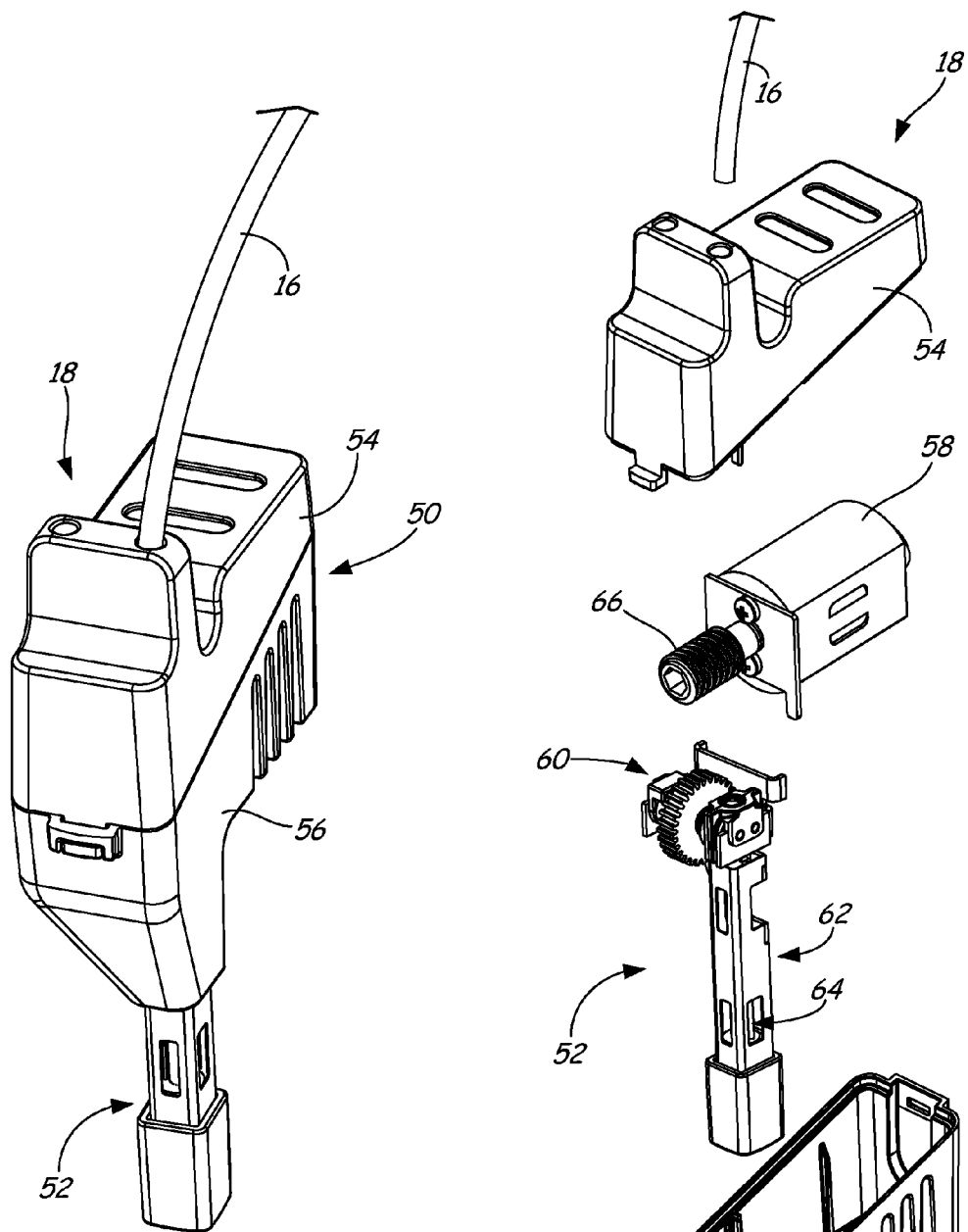
FIG. 2A is a perspective view of a print head and guide tube for use with the additive manufacturing system, where the print head includes the liquefier assembly.
Figure 2B:
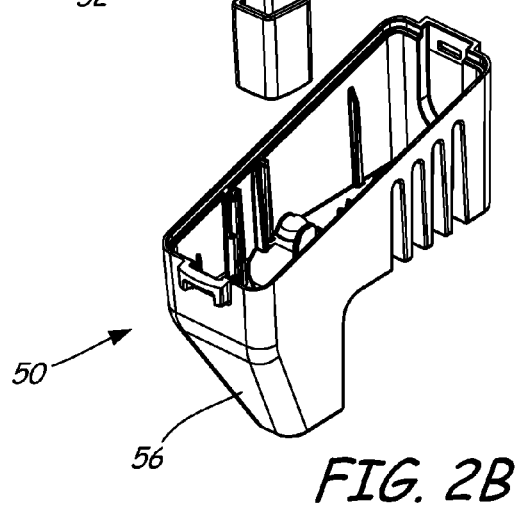
FIG. 2B is an exploded perspective view of the print head, showing a pump assembly that includes the liquefier assembly.

FIGS. 2A and 2B illustrate an example embodiment of print head 18, which includes a liquefier assembly of the present disclosure. As shown in FIG. 2A, print head 18 includes cartridge assembly 50 and pump assembly 52, where a rear portion of cartridge assembly 50 may be retained by head carriage 36 (shown in FIG. 1) such that pump assembly 52 extends downward from a front portion of cartridge assembly 50. In the shown embodiment, cartridge assembly 50 includes housing cover 54 and housing body 56, which may be secured to together during use.

As shown in FIG. 2B, print head 18 may also include motor 58, where motor 58 may be fully encased within housing cover 54 and housing body 56. As further shown, pump assembly 52 is partially encased within housing cover 54 and housing body 56, and includes filament drive mechanism 60, backbone assembly 62, and liquefier assembly 64 of the present disclosure. Liquefier assembly 64 is preferably encased by backbone assembly 62, and filament drive mechanism 60 may be retained by backbone assembly 62 at an upstream location relative to liquefier assembly 64.

Motor 58 is configured to receive electrical power from system 10 via electrical connections (not shown) for rotating gear 66. Gear 66 is a threaded-surface gear that is axially connected to motor 58 to receive the generated rotational power. Gear 66 correspondingly engages filament drive mechanism 60 to relay the rotational power to filament drive mechanism 60.

Examples of suitable components for cartridge assembly 50, motor 58, filament drive mechanism 60, and backbone assembly 62 include those discussed in Swanson et al., U.S. Publication No. 2012/0164256, which is incorporated by reference in its entirety to the extent that it does not conflict with the present disclosure. Additionally, further examples of suitable components for filament drive mechanism 60 include those disclosed in co-filed U.S. patent application Ser. No. 13/708,116, filed Dec. 7, 2012, entitled "Filament Drive Mechanism For Use In Additive Manufacturing System", which is incorporated by reference in its entirety to the extent that it does not conflict with the present disclosure.

Figure 3:
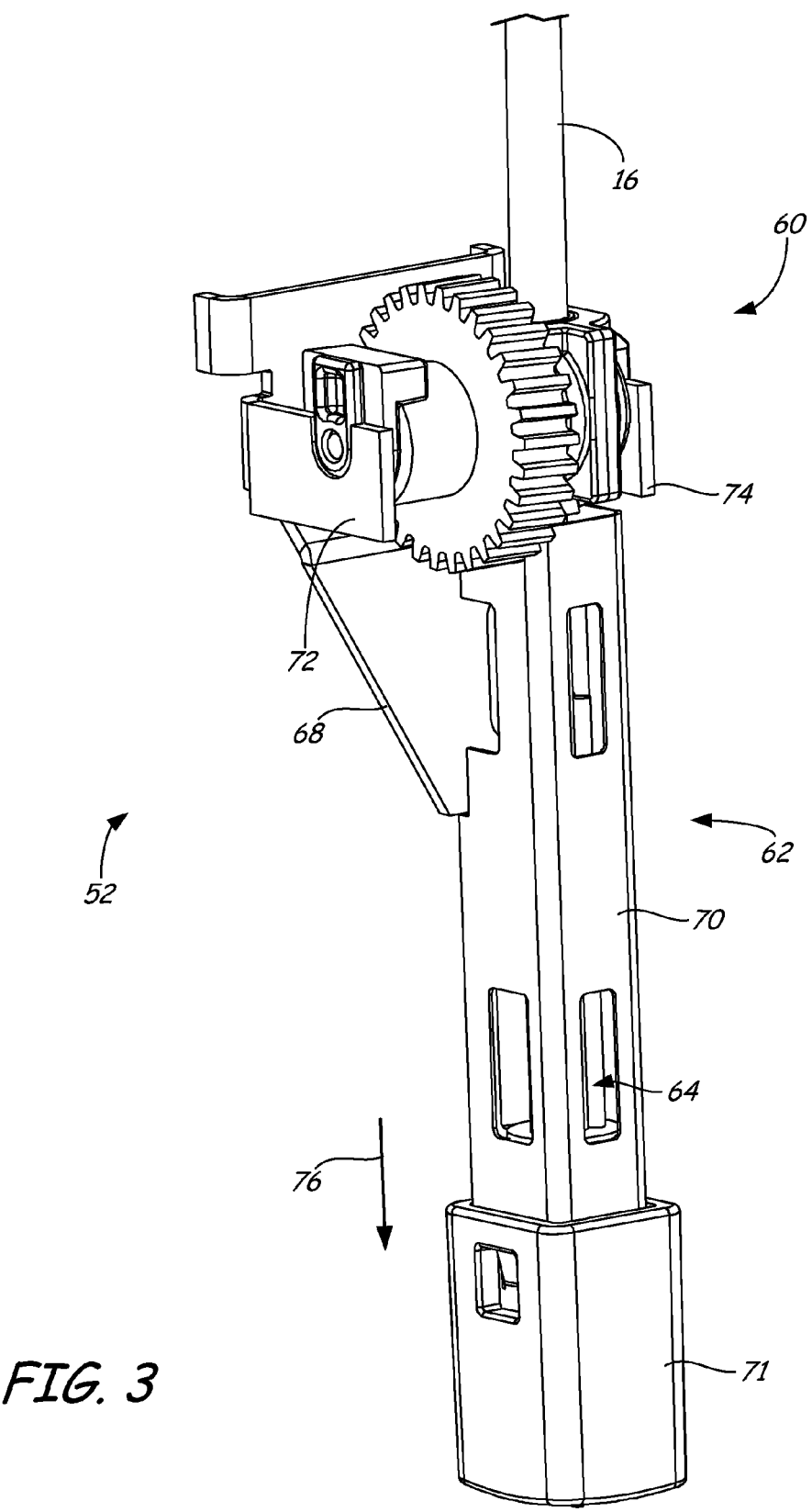
FIG. 3 is a perspective view of the pump assembly, showing the liquefier assembly.

FIG. 3 further illustrates pump assembly 52 in use with guide tube 16. As shown, backbone assembly 62 is a structure component of pump assembly 52 and includes backbone plate 68 and heat shield 70, as discussed in Swanson et al., U.S. Publication No. 2012/0164256, and also includes tip shield 72. Filament drive mechanism 60 is retained by retention arms 72 and 74 of backbone plate 68 at a location upstream from liquefier assembly 64, and is configured to feed successive portions of a consumable filament (not shown) from guide tube 16 to liquefier assembly 64 based on the rotational power of motor 58 and gear 66. As used herein, the terms "upstream" and "downstream" are made with reference to a filament feed direction, such as along arrow 76, for example.

Figure 4:
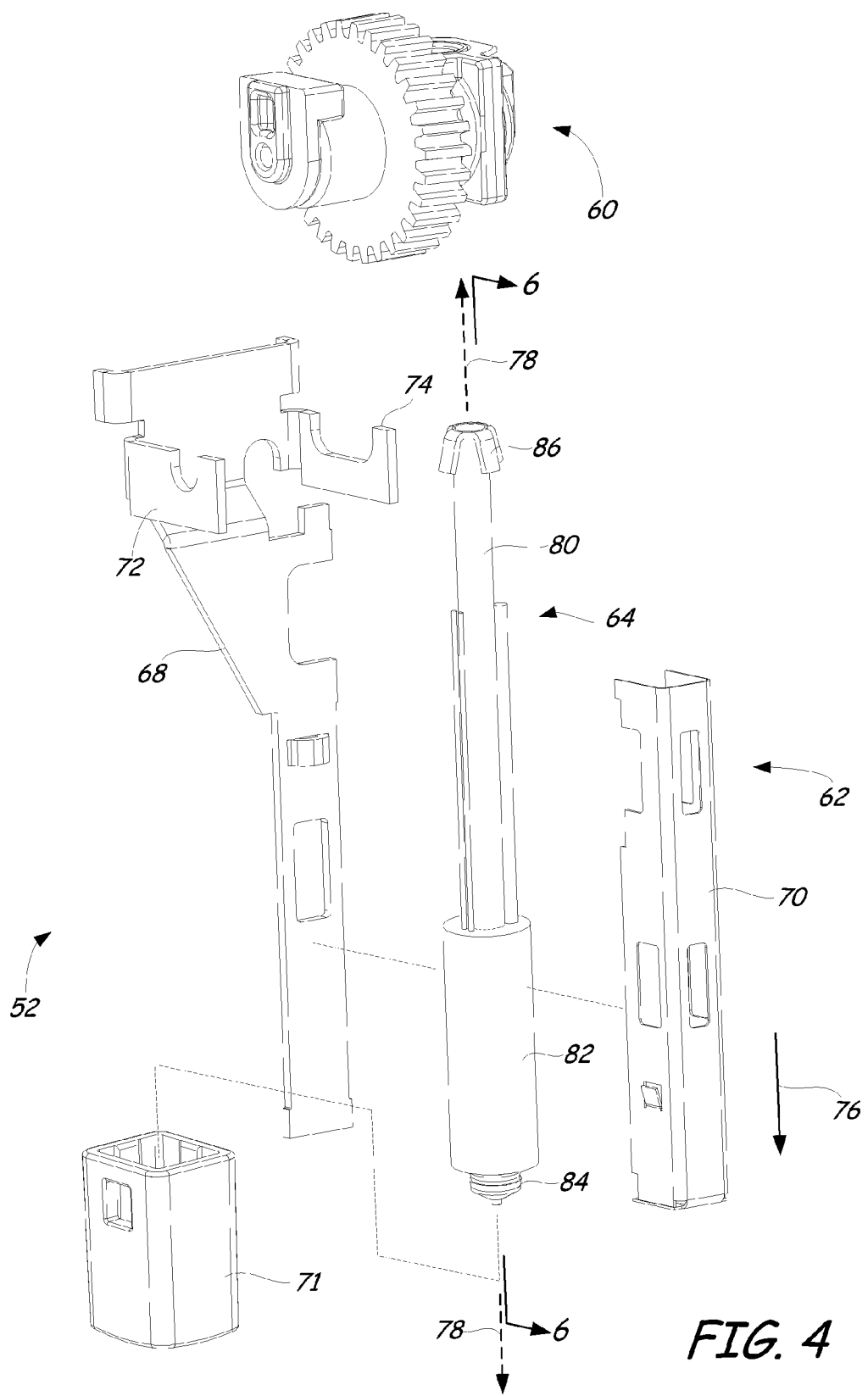
FIG. 4 is an exploded perspective view of the pump assembly, further illustrating the liquefier assembly.
Figure 5:
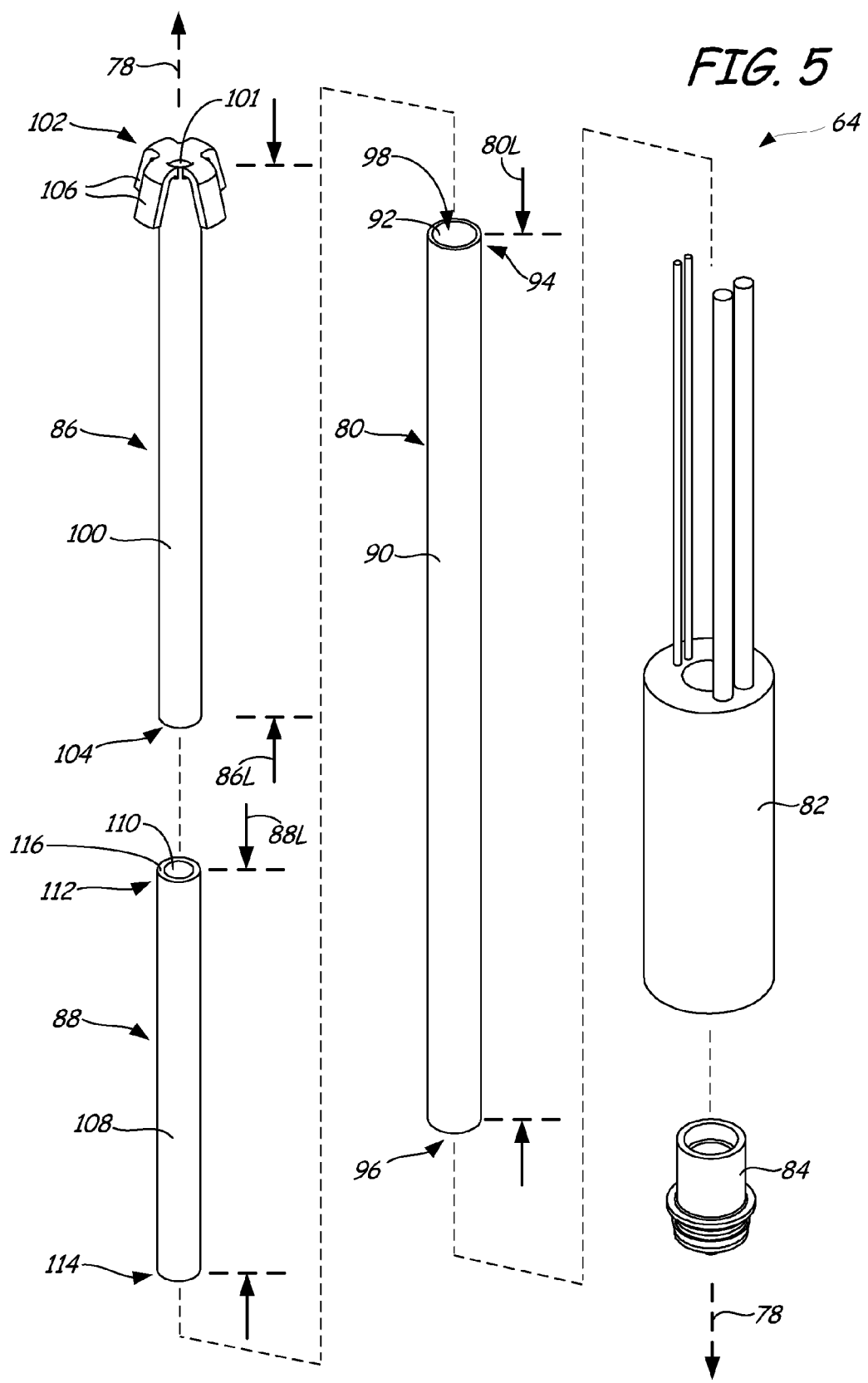
FIG. 5 is an exploded perspective view of the liquefier assembly.

As shown in FIG. 4, liquefier assembly 64 extends along longitudinal axis 78, and component-wise, includes liquefier tube 80, thermal sleeve 82, nozzle 84, and liner 86. As shown in FIG. 5, liquefier assembly 64 also includes spacer 88.

Liquefier tube 80 is a rigid tube fabricated from one or more thermally-conductive materials (e.g., stainless steel), and includes outer surface 90 and inner surface 92, as well as inlet end 94, outlet end 96, and channel 98 extending therebetween along longitudinal axis 78. Liquefier tube 80 is preferably is thin walled, having a wall thickness between outer surface 90 and inner surface 92 ranging from about 0.01 inches to about 0.03 inches, and more preferably from about 0.015 to about 0.020. Preferred inner diameters for liquefier tube 80 range from about 0.08 inches to about 0.10 inches, more preferably from about 0.090 inches to about 0.095 inches.

Liquefier tube 80 also preferably has a length along longitudinal axis 78 that is compact, yet long enough to provide a suitable hot zone (referred to as hot zone 120, shown below in FIG. 7), and for offsetting liner 86 upstream from the hot zone by a sufficient distance. Preferred lengths for liquefier tube 80 between inlet end 94 and outlet end 96 (referred to as length 80L) include at least about 1.5 inches, more preferably from about 1.5 inches to about 5 inches, and even more preferably from about 2.0 inches to about 3.0 inches.

The discussion of liquefier assembly 64 is made herein with reference to longitudinal axis 78 and a cylindrical geometry extending along longitudinal axis 78. However, in alternative embodiments, liquefier assembly 64 may have a non-cylindrical geometry, such as disclosed in Batchelder et al., U.S. Patent Application Publication No. 2011/0074065. Accordingly, as used herein unless otherwise indicated, the terms "tube", "hollow liner", "hollow spacer", and the like, include a variety of hollow geometries, such as cylindrical geometries, elliptical geometries, polygonal geometries (e.g., rectangular and square geometries), axially-tapered geometries, and the like.

Thermal sleeve 82 is an example heating element extending around a downstream segment of liquefier tube 80 to generate the hot zone along liquefier tube 80 during a printing operation. Examples of suitable assemblies for thermal sleeve 82 include those disclosed in Swanson et al., U.S. Publication Nos. 2012/0018924 and 2012/0070523, each of which is incorporated by reference in its entirety to the extent that it does not conflict with the present disclosure. Other suitable configurations for thermal sleeve 82 include a heating block as disclosed in U.S. Pat. No. 6,004,124, or other heating element configured to heat the hot zone. The thermal sleeve 82 may also include multiple heat-controlled zones to provide a multi-zone liquefier such as is disclosed in U.S. Publication No. 2012/0018924.

Nozzle 84 is a small-diameter nozzle secured to liquefier tube 80 at outlet end 96 and is configured to extrude molten material at a desired road width. Preferred inner tip diameters for nozzle 84 include diameters up to about 760 micrometers (about 0.030 inches), and more preferably range from about 125 micrometers (about 0.005 inches) to about 510 micrometers (about 0.020 inches). In some embodiments, nozzle 84 may include one or more recessed grooves to produce roads having different road widths, as disclosed in Swanson et al., U.S. patent application Ser. No. 13/587,002.

Liner 86 and spacer 88 are inserted into channel 98 during use to provide customized thermal, conductive, and frictional properties for liquefier tube 80. Liner 86 is a hollow liner having outer surface 100 and inner surface 101, as well as top or upstream end 102 and bottom or downstream end 104 offset along longitudinal axis 78.

Liner 86 is fabricated from a low surface energy material, at least at its interior surface, to reduce drive pressures required to feed filaments through liquefier assembly 64. Preferred materials for liner 86 include fluorinated polymers (e.g., perfluoropolymers). Examples of suitable fluorinated polymers for liner 86 include polytetrafluoroethylenes (PTFE), fluorinated ethylene propylenes, and perfluoroalkoxy polymers. Examples of preferred commercially available fluorinated polymers include PTFE available under the trade designation "TEFLON" from E.I. du Pont de Nemours and Company, Wilmington, Del.

The material for liner 86 may also include one or more fillers to increase the thermal and mechanical properties of liner 86, such as glass fibers, carbon fibers, and the like. Preferred concentrations of the one or more fillers in the material for liner 86 range from about 0.01% to about 30% by weight, and more preferably from about 5% to about 25% by weight. In some preferred embodiments, the material for liner 86 compositionally consists essentially of the one or more fluorinated polymers and the one or more fillers, such as PTFE and one or more glass fillers.

As shown, liner 86 may also include flanges 106 at top end 102, which prevent liner 86 from sliding downward into liquefier tube 80. As discussed in co-filed U.S. patent application Ser. No. 13/708,116, filed Dec. 7, 2012, entitled "Filament Drive Mechanism For Use In Additive Manufacturing System", the inlet end of liquefier assembly 64 may engage filament drive mechanism 60. This engagement is suitable for preventing liner 86 from pulling upward out of liquefier tube 80, such as when a filament withdrawn upward out of liquefier assembly 64. Alternatively, liquefier assembly 64 may include other mechanisms for restraining liner 86 to liquefier tube 80, such as a hollow cap (not shown), securable to liquefier tube 80 at inlet end 94.

In comparison to liner 86, spacer 88 is preferably a rigid, thermally-stable, hollow spacer that retains liner 86 upstream from the hot zone of liquefier assembly 64. Spacer 88 has outer surface 108 and inner surface 110, as well as top or upstream end 112 and bottom or downstream end 114 offset along longitudinal axis 78, where top end 112 defines shoulder 116.

Spacer 88 is preferably fabricated from one or more thermally-stable, thermally-conductive, and high surface energy materials to maintain good melt flow models in liquefier assembly 64, such as discussed in Comb, U.S. Pat. No. 6,547, 995. Preferred materials for spacer 88 include metallic materials, such as stainless steel, aluminum, and the like, and may be fabricated from the same material as liquefier tube 80 to reduce variations in the thermal gradient along longitudinal axis 78. For example, liquefier tube 80 and spacer 88 may each be fabricated from stainless steel.

Liner 86 and spacer 88 each preferably have wall thicknesses that reduce the cross-sectional gap (e.g., radial gap) relative to a received filament. As mentioned above, the reduced cross-sectional gap reduces back flows of the molten filament materials during seam starts, which can reduce seam variations during printing operations. Accordingly, the wall thicknesses of liner 86 and spacer 88 may vary depending on the dimensions of liquefier tube 80 and the received filament. Preferably, the wall thicknesses of liner 86 and spacer 88 each provide an average cross-sectional gap relative to a received filament less than about 0.01 inches, more preferably ranging from about 0.001 inches to about 0.01 inches, and even more preferably from about 0.002 inches to about 0.005 inches.

Furthermore, the wall thicknesses of liner 86 and spacer 88 preferably provide slip fit dimensions for inserting liner 86 and spacer 88 into channel 98 of liquefier tube 80. For example, a gap between inner surface 92 of liquefier assembly 80 and outer surfaces 100 and 108 of liner 86 and spacer 88 may range from about 0.001 inches to about 0.01 inches, more preferably from about 0.002 inches to about 0.005 inches. This slip-fit arrangement allows liner 86 and spacer 88 to be readily inserted into liquefier assembly 80, reducing the costs and time for manufacturing liquefier assembly 64. In some embodiments, one or both of liner 86 and spacer 88 may be adhered to inner surface 92 of liquefier tube 80 with one or more adhesive materials. This embodiment may be beneficial for reducing lift pressures that may otherwise longitudinally compress liner 86.

In some embodiments, spacer 88 has a thinner wall than liner 86 such the inner cross-sectional area (e.g. inner diameter) of spacer 88 is greater than the inner cross-sectional area of liner 86 by a small distance. This reduces the risk of having the received filaments catching on shoulder 116 during an initial loading step. Alternatively, shoulder 116 may have chamfered edge to reduce the risk of filament catching.

Spacer 88 preferably has a length along longitudinal axis 78 that is suitable for positioning bottom end 104 of liner 86 at an upstream location that is sufficiently offset from the hot zone of liquefier tube 80 such that liner 86 is not heated above a temperature that could thermally degrade liner 86. Preferred lengths for spacer 88 between top end 112 and bottom end 114 (referred to as length 88L) include at least about 0.5 inches, more preferably from about 0.5 inches to about 3.0 inches, and even more preferably from about 0.7 inches to about 1.5 inches.

Liner 86 accordingly may have a length extending from shoulder 116 to at least inlet end 94 of liquefier tube 80, and may even extend upstream from inlet end 94 of liquefier tube 80, if desired. For use with liquefier tube 80 and spacer 88 having the above-discussed lengths, preferred lengths for liner 86 between top end 104 and bottom end 106 (referred to as length 86L) include at least about 0.5 inches, more preferably from about 0.5 inches to about 4.0 inches, and even more preferably from about 1.0 inch to about 1.5 inches.

While illustrated with a single liner 86 and a single spacer 88, liquefier assembly 64 may alternatively include multiple liners 86 and/or multiple spacers 88 extending axially relative to each other. For example, spacer 88 may be replaced with multiple shorter spacers 88, where each shorter spacer 88 may be fabricated from or coated with different materials to modify the characteristics of liquefier assembly 64, such as frictional properties, heat resistance, thermal conductivity, oxidation resistance, and the like.

Figure 6:
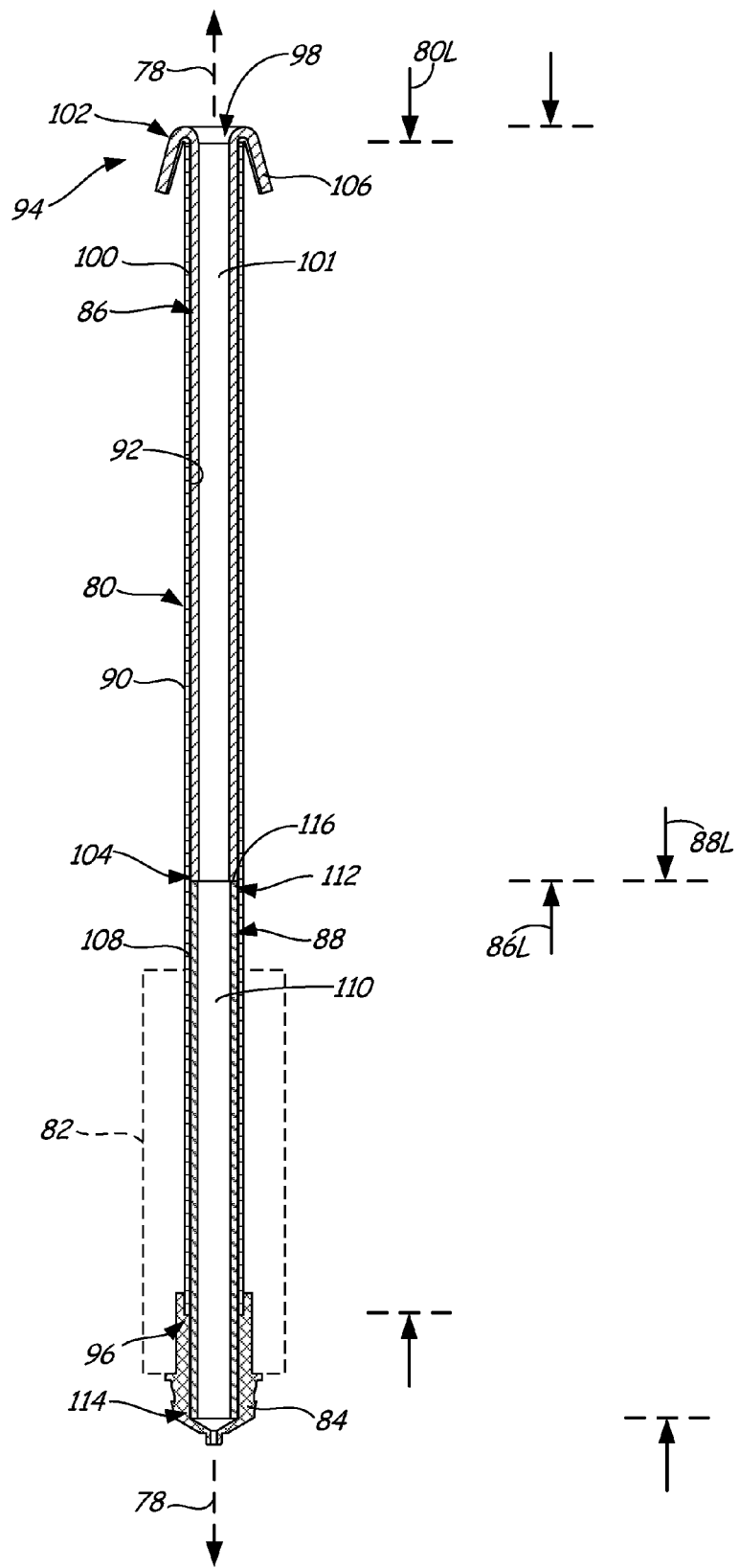
FIG. 6 is a sectional view of section 6-6 taken in FIG. 4, further illustrating the liquefier assembly.

As shown in FIG. 6, liquefier assembly 64 may be assembled by securing thermal sleeve 82 around the downstream segment of liquefier tube 80, and securing nozzle 84 to outlet end 96 of liquefier tube 80. Spacer 88 may then be inserted into channel 98 from inlet end 94 of liquefier tube 80 until bottom end 114 of spacer 88 inserts into and abuts against nozzle 84. Alternatively, spacer 88 may be inserted into channel 98 from outlet end 96 prior to securing nozzle 84 to outlet end 96. When spacer 88 is inserted into channel 98 as shown, top end 112 of spacer 88 defines shoulder 116, as mentioned above. Liner 86 may then be inserted into channel 98 from inlet end 94 of liquefier tube 80 until bottom end 104 of liner 86 abuts against and is supported by shoulder 116. This prevents liner 86 from stretching during use. Flanges 106 may also be folded over inlet end 94 of liquefier tube 80, and the resulting liquefier assembly 64 may be mounted in backbone assembly 62 and engaged with filament drive mechanism 60.

Figure 7:
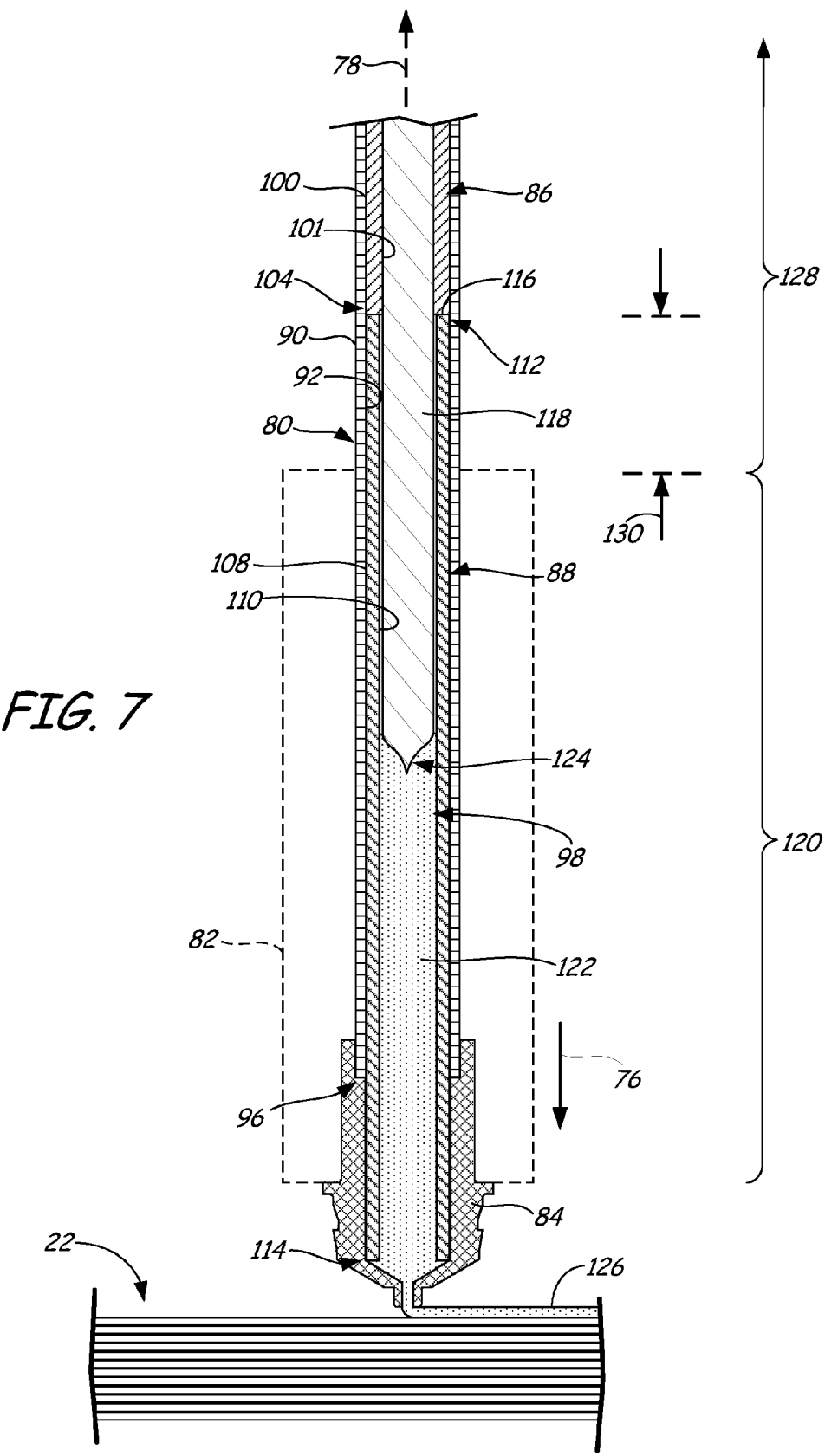
FIG. 7 is an expanded sectional view of a portion of the liquefier assembly in use with a filament to print a 3D part.

FIG. 7 illustrates liquefier assembly 64 in use with filament 118 for printing 3D part 22 (or support structure 24) in a layer-by-layer manner. During the printing operation, filament 118 extends through channel 98 from inlet end 94, and through liner 86 and spacer 88. Controller 46 (shown in FIG. 1) directs thermal sleeve 82 to heat the encased region of liquefier tube 80 to one or more elevated temperatures to generate hot zone 120. The heating of liquefier tube 80 at hot zone 120 melts the material of filament 118 to form melt 122.

The molten portion of the filament material (i.e., melt 122) forms meniscus 124 around the unmelted portion of filament 118. During an extrusion of melt 122 through nozzle 84, the downward movement of filament 118 in the direction of arrow 76 functions as a viscosity pump to extrude the material in melt 122 out of nozzle 84 as extruded road 126 for printing 3D part 22.

The upstream region of liquefier tube 80 above hot zone 120, referred to as transition zone 128, is not directly heated by thermal sleeve 82. This generates a thermal gradient or profile along the longitudinal length of liquefier tube 80. In some embodiments, cooling air or ambient air may also be blown toward the inlet end of liquefier assembly 64, maintaining the zone 128 at a "cold" temperature.

Spacer 88 offsets bottom end 104 of liner 86 upstream from hot zone 120 by offset distance 130. Offset distance 130 is preferably a distance along longitudinal axis 78 over which the thermal gradient of liquefier tube 80 cools down from the elevated temperature(s) at hot zone 120 to a lower temperature at which the material of liner 86 (e.g., a fluoropolymer) is thermally stable. It has been found that even a small offset distance 130 along longitudinal axis 78 can result in a substantial decrease in temperature that liner 86 is exposed to.

For example, when printing 3D part 22 from an acrylonitrile butadiene styrene (ABS)-M30 copolymer from Stratasys, Inc., Eden Prairie, Minn., if bottom end 104 of line 86 resided at the top edge of hot zone 120 (i.e., offset distance is zero), bottom end 104 could be heated to about 235° C., which can thermally degrade liner 86 over time. However, if offset distance 130 is increased to about 0.2 inches above hot zone 120, bottom end 104 of liner 86 will only be heated to about 170° C., at which it is thermally stable. In other words, an offset distance 130 of about 0.2 inches can reduce the exposure temperature by about 65° C. and thereby preserve integrity of the liner 86 and also preventing clogging of the nozzle 84.

Accordingly, in some preferred embodiments, offset distance 130 is positioned such that bottom end 104 of liner 86 remains below about 200° C., more preferably below about 185° C., and even more preferably below about 175° C. Stated in another manner, in some preferred embodiments, offset distance 130 is positioned such that bottom end 104 of liner 86 remains at least about 35° C., more preferably at least about 50° C., and even more preferably about 60° C. below the temperature of the top or upstream edge of hot zone 120.

Furthermore, in some embodiments, such as those in which liquefier assembly 64 is configured to receive a filament of a "sticky" or abrasive material (for example, the "SR" family of soluble support materials sold by Stratasys, Inc.), offset distance 130 is also preferably set such that bottom end 104 of liner 86 remains above about 130° C. during operation to prevent the soluble support material from solidifying and plugging liquefier assembly 64. Examples of preferred distances for offset distance 130 above hot zone 120 range from about 0.15 inches to about 1.0 inch, and more preferably from about 0.2 inches to about 0.5 inches.

As can be appreciated, if spacer 88 is otherwise omitted and liner 86 extends down to nozzle 84, the segment of liner 86 within hot zone 120 would thermally degrade over time, potentially causing pieces of liner 86 to tear off and clog nozzle 84. Alternatively, if liner 86 is then shortened to the upstream location shown in FIG. 7, and spacer 88 remains omitted, the wider inner cross-sectional area of liquefier tube 80 at hot zone 120 increases the cross-sectional gap relative to filament 118. As discussed above, a larger cross-sectional gap can increase a back flow of melt 122 during seam starts. Small cross-sectional gaps create more resistance against back flow compared to larger cross-sectional gaps. As such, with larger cross-sectional gaps, the path of least resistance for melt 122 is back into liquefier tube 80 rather than out of nozzle 84. This back flow can undesirably increase seam variations during printing operations.

On the other hand, if liner 86 is omitted and a metallic spacer 88 extends along the entire length of liquefier tube 80 (or if liquefier tube 80 has a smaller inner cross-sectional area), the higher surface energy of the metallic materials of liquefier tube 86 and spacer 88 would increase the drive pressure required to feed filament 118 into liquefier tube 80, which can result in filament slippage at filament drive mechanism 60, as discussed in co-filed U.S. patent application Ser. No. 13/708,116, filed Dec. 7, 2012, entitled "Filament Drive Mechanism For Use In Additive Manufacturing System". Additionally, if filament 118 compositionally has a higher surface energy, the soluble support material may adhere to the walls of liquefier tube 80 and/or spacer 88 at transition zone 128, potentially plugging liquefier tube 80.

Accordingly, the combination of a upstream, low-surface energy, hollow liner 86 and a downstream, thermally-stable, hollow spacer 88, preserves the operating life of liner 86 while also reducing seam variations during printing operations. As can be appreciated, the relative lengths of liner 86 and spacer 88 may be adjusted to accommodate thermal requirements of a variety of different part and support materials, as well as accommodating particularized flow profiles. Generally, if the temperature of hot zone 120 is increased to accommodate a higher-temperature material, offset distance 130 is preferably increased to maintain bottom end 104 of liner 86 at a thermally-stable temperature, such as below about 200° C., more preferably below about 185° C., and even more preferably below about 175° C.

Figure 8:
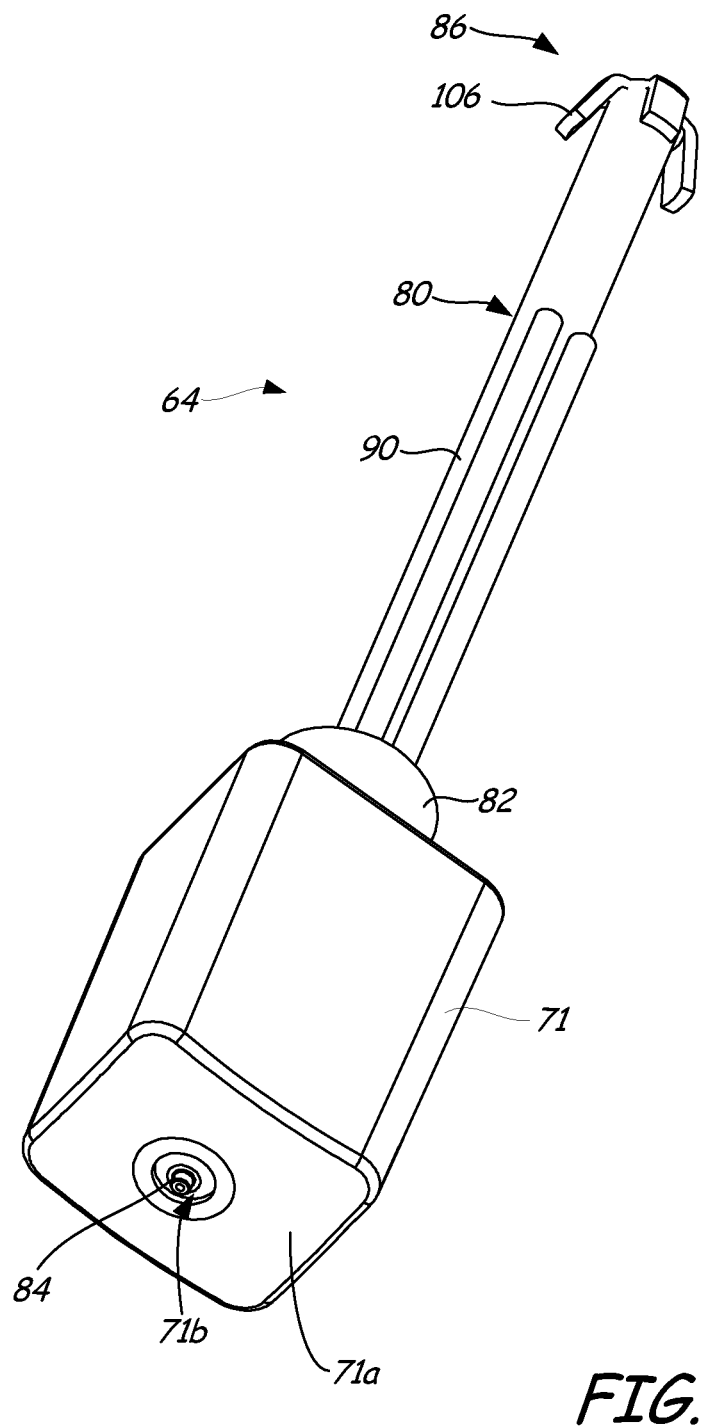
FIG. 8 is a bottom perspective view of the liquefier assembly.

As shown in FIG. 8, tip shield 71 includes surface 71a and gap 71b, where nozzle 84 extends through gap 71b with a radial extent preferably ranging from about 0.1 inches to about 1 inch. Tip shield 71 may be fabricated from one or more metallic materials (e.g., stainless steel), allowing it to withstand elevated temperatures. In the shown embodiment, tip shield 71 may also include a low surface energy coating or surface 71a (e.g., PTFE).

During a printing operation, several effects can occur as nozzle 84 extrudes fine features onto a 3D part under construction. First, the exit tip face of nozzle 84 and the bevel around the exit (and all of the heated components of liquefier assembly 64) can radiate heat onto the 3D part under construction, which can soften the 3D part such that accuracy and feature detail can be lost. Without the low surface energy bevel, nozzle 84 is both hot and may have a high surface energy material, so newly extruded material might adhere to nozzle 84 instead of to the 3D part under construction. The motion of the nozzle tip face across the 3D part under construction can skive the part material under the tip face of nozzle 84, where the skived material can oxidize and discolor, and then potentially deposit back onto the 3D part under construction.

Surface 71a of tip shield 71, however, blocks radiation from the bulk of liquefier assembly 64 from reaching the 3D part under construction, and reduces the accessible area of heated nozzle 84 to a small area. As can be appreciated, this reduces the radiant heating of fine part features, increasing the adhesion of small features to 3D parts. Additionally, surface 71a reduce material accumulation on nozzle 84, thereby reducing the risk of excess part materials from interfering with the printing operations.

Suitable consumable filaments for filament 118 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495. Furthermore, the consumable filaments may each include encoded markings, as disclosed in Batchelder et al., U.S. Patent Application Publication Nos. 2011/0117268, 2011/0121476, and 2011/0233804, which may be used with sensor assemblies 44 of system 10; and/or topographical surfaces patterns (e.g., tracks) as disclosed in Batchelder et al., U.S. Pat. No. 8,236,227. The length of filament 118 may be any suitable length, and is preferably more than about 100 feet.

Filament 118 desirably exhibits physical properties that allow it to be used as a consumable material in system 10. In particular, filament 118 is desirably flexible along its length to allow it to be retained in container 14 and to be fed through guide tube 16 without plastically deforming or fracturing. Additionally, filament 118 also desirably exhibits low compressibility such that its axial compression doesn't cause filament 118 to be seized within liquefier assembly 64.

In the shown embodiment, filament 118 has a substantially cylindrical geometry (i.e., a substantially circular cross section). In this embodiment, filament 118 may have an average diameter ranging from about 1.0 millimeter (about 0.04 inches) to about 3.0 millimeters (about 0.12 inches). In some embodiments, the average diameter of filament 118 preferably ranges from about 1.0 millimeter (about 0.04 inches) to about 1.5 millimeters (about 0.06 inches). In other embodiments, the average diameter of filament 118 preferably ranges from about 1.5 millimeters (about 0.06 inches) to about 2.0 millimeters (about 0.08 inches). As used herein, the term "average diameter" of a filament is an average based on a 100-foot segment length of the filament. The above-discussed ranges for the average diameter of filament 118 may alternatively be referred to based on the average cross-sectional area of filament 118.

Alternatively, filament 118 may have a non-cylindrical geometry, such as a ribbon filament as disclosed in Batchelder et al., U.S. Pat. No. 8,221,669. In this embodiment, print head 18 may include a ribbon liquefier assembly as disclosed in Batchelder et al., U.S. Application Publication No. 2011/0074065; and in Swanson et al., U.S. Application Publication No. 2012/0070523. In the ribbon-filament embodiment, filament 118 may have an average width and an average thickness, where the average width for ribbon filament 118 may range from about 1.0 millimeter (about 0.04 inches) to about 10.2 millimeters (about 0.40 inches), and more preferably from about 2.5 millimeters (about 0.10 inches) to about 7.6 millimeters (about 0.30 inches). The average thickness for ribbon filament 118 may range from about 0.38 millimeters (about 0.015 inches) to about 1.3 millimeters (about 0.05 inches), and more preferably from about 0.51 millimeters (about 0.02 inches) to about 1.0 millimeter (about 0.04 inches).

As used herein, the terms "average width" and "average thickness" of a ribbon filament are each an average based on a 100-foot segment length of the ribbon filament. The above-discussed ranges for the average width and the average thickness may alternatively be referred to based on the average cross-sectional area of ribbon filament 118. Furthermore, the cross-sectional dimensions of ribbon filament 118 for the ribbon-filament embodiment may also be referred to based on the cross-sectional aspect ratio of the average width to the average thickness. For example, the cross-sectional aspect ratio (width-to-thickness) may range from about 2:1 to about 20:1. In some embodiments, the cross-sectional aspect ratio ranges from about 2.5:1 to about 10:1, and in further embodiments from about 3:1 to about 10:1.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Liquefier assemblies of Examples 1 and 2, and Comparative Examples A-C were prepared and tested for reliability while printing support structures from a soluble support material filament commercially available under the trademark "SR30" from Stratasys, Inc., Eden Prairie, Minn., which had a cylindrical geometry with an average diameter of 0.05 inches.

The liquefier assembly of Examples 1 and 2 each included a cylindrical stainless steel liquefier tube having a 0.091 inch inner diameter and a 2.4 inch length, which was capped with a nozzle. Additionally, Examples 1 and 2 each included a cylindrical stainless steel spacer inserted into the liquefier tube to abut the nozzle, and a fluoropolymer liner inserted into the liquefier tube to abut against a shoulder of the spacer, as illustrated by liquefier assembly 64 in FIG. 6. Each spacer was 1.0 inch in length and had a 0.059-inch inner diameter, and each liner has 1.4 inches in length and had a 0.057-inch inner diameter. The fluoropolymer liner of Example 1 was a virgin PTFE material, and the fluoropolymer liner of Example 2 was a glass-filled PTFE material.

The liquefier assemblies of Comparative Examples A-C included the same liquefier tube and nozzle as Examples 1 and 2, but did not include any spacers. Instead, the liquefier assembly of Comparative Example A included a 1.7-inch stainless steel (SST) liner inserted into the liquefier tube to abut against the nozzle. The liquefier assembly of Comparative Example B included a 1.8-inch perfluoroalkoxy (PFA) liner inserted into the liquefier tube to abut against the nozzle. The liquefier assembly of Comparative Example C included a 1.8-inch polyetheretherketone (PEEK) liner inserted into the liquefier tube to abut against the nozzle.

Each liquefier assembly of Examples 1 and 2, and Comparative Examples A-C was encased in a thermal sleeve and operated in an additive manufacturing system commercially available under the trademark "MOJO" from Stratasys, Inc., Eden Prairie, Minn. to print support structures from the soluble support material. The liquefier assemblies of Examples 1 and 2 reliably printed the support structures for more than 80 cubic inches of the soluble support material.

In comparison, the liquefier assemblies of Comparative Examples A-C each plugged up during the printing operations. In the liquefier assembly of Comparative Example A having the long SST liner, the soluble support material promptly solidified in the SST liner and plugged the liquefier assembly. In the liquefier assembly of Comparative Example B having the long PFA liner, the liquefier assembly also plugged within one hour of operation, believed to be due to thermal degradation and breakage of the PFA liner. In the liquefier assembly of Comparative Example C having the long PEEK liner, the soluble support material plugged the liquefier assembly within two purges.

Therefore, the combination of the fluoropolymer liner and the metallic spacer, which offsets the fluoropolymer liner upstream from the hot zone, increases the reliability of a resulting liquefier assembly and associated print head. The offset distance of the fluoropolymer liners for Examples 1 and 2 reduced the exposure temperatures that they were subjected to by more than 70° C. from the temperature of the hot zone. This preserved the integrity of the fluoropolymer liners, increasing their life spans while they provided a low surface energy passage-way in the unheated zone to prevent the soluble support material from solidifying and plugging the liquefier assemblies.

Although the present disclosure has been described with reference to preferred embodiments, workers skilled in the art will recognize that changes may be made in form and detail without departing from the spirit and scope of the disclosure.

The invention claimed is:

1. A liquefier assembly for use in an additive manufacturing system, the liquefier assembly comprising:
   a liquefier tube compositionally comprising a first metallic material, and having an inlet end and outlet end offset along a longitudinal axis, and a channel extending between the inlet end and the outlet end;
   a nozzle secured to the outlet end of the liquefier tube;
   a heating element extending at least partially around the liquefier tube, wherein the heating element is configured to generate a hot zone in the liquefier tube;

at least one hollow spacer compositionally comprising a second metallic material, the at least one hollow spacer being disposed in the channel and having a first end adjacent to the nozzle and a second end that defines a shoulder that is upstream along the longitudinal axis from the hot zone when generated by the heating element; and a hollow liner compositionally comprising a fluoropolymer, the hollow liner being disposed in the channel and having a first end abutting against the shoulder of the at least one hollow spacer.

2. The liquefier assembly of claim 1, wherein the fluoropolymer of the hollow liner comprises polytetrafluoroethylene.

3. The liquefier assembly of claim 1, wherein the hollow liner further compositionally comprises from about 0.1% to about 30% of one or more fillers.

4. The liquefier assembly of claim 1, wherein the first metallic material of the liquefier tube and the second metallic material of the at least one hollow spacer each comprise stainless steel.

5. The liquefier assembly of claim 1, wherein the shoulder of the at least one hollow spacer is located at an offset distance above the hot zone that ranges from about 0.15 inches to about 1.0 inch.

6. The liquefier assembly of claim 1, wherein the at least one hollow spacer comprises a plurality of hollow spacers each having an inner surface derived from a different material.

7. The liquefier assembly of claim 1, wherein the at least one hollow spacer and the hollow liner each provide an average cross-sectional gap relative to a received filament less than about 0.01 inches.

8. A liquefier assembly for use in an additive manufacturing system, the liquefier assembly comprising:
  a liquefier tube having an inlet end, an outlet end, and a channel extending therebetween;
  a nozzle secured to the outlet end of the liquefier tube;
  a heating element extending at least partially around the liquefier tube, wherein the heating element is configured to generate a hot zone in the liquefier tube;
  a hollow spacer disposed in the channel, the hollow spacer having a downstream end adjacent to the nozzle and an upstream end defining a shoulder; and
  a hollow liner disposed in the channel and having a downstream end abutting against the shoulder of the hollow spacer, wherein the shoulder of the hollow spacer is positioned along the channel such that the downstream end of the hollow liner remains at least about 35° C. below a temperature of an upstream edge of the hot zone when generated by the thermal element.

9. The liquefier assembly of claim 8, wherein the shoulder of the hollow spacer is positioned along the channel such that the downstream end of the hollow liner remains at least about 50° C. below the temperature of the upstream edge of the hot zone when generated by the thermal element.

10. The liquefier assembly of claim 9, wherein the shoulder of the hollow spacer is positioned along the channel such that the downstream end of the hollow liner remains at least about 60° C. below the temperature of the upstream edge of the hot zone when generated by the thermal element.

11. The liquefier assembly of claim 8, wherein the shoulder of the hollow spacer is positioned along the channel such that the downstream end of the hollow liner remains below about 185° C. when the thermal element generates that hot zone in the liquefier tube.

12. The liquefier assembly of claim 11, wherein the shoulder of the hollow spacer is positioned along the channel such that the downstream end of the hollow liner remains below about 175° C. when the thermal element generates that hot zone in the liquefier tube.

13. The liquefier assembly of claim 8, wherein the hollow liner compositionally comprises a fluoropolymer, and wherein the hollow spacer compositionally comprises a metallic material.

14. The liquefier assembly of claim 13, wherein the hollow liner further compositionally comprises from about 0.1% to about 30% of one or more fillers.

* * * * *